(12) United States Patent
Marion et al.

(10) Patent No.: US 8,661,089 B2
(45) Date of Patent: Feb. 25, 2014

(54) VIOS CLUSTER ALERT FRAMEWORK

(75) Inventors: Neal Richard Marion, Georgetown, TX (US); James A. Pafumi, Leander, TX (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 12/962,930

(22) Filed: Dec. 8, 2010

(65) Prior Publication Data

US 2012/0150985 A1  Jun. 14, 2012

(51) Int. Cl.
*G06F 15/16* (2006.01)
(52) U.S. Cl.
USPC .......................................... 709/207; 709/209
(58) Field of Classification Search
USPC ................................................. 709/207–209
See application file for complete search history.

(56) References Cited

U.S. PATENT DOCUMENTS

| 5,305,454 | A | 4/1994 | Record |
| 8,103,810 | B2* | 1/2012 | Brown et al. .................... 710/62 |
| 8,458,413 | B2* | 6/2013 | Ganti et al. .................... 711/153 |
| 2006/0123024 | A1 | 6/2006 | Sathyanarayan |
| 2008/0189468 | A1 | 8/2008 | Schmidt |
| 2009/0307378 | A1 | 12/2009 | Allen |
| 2009/0307688 | A1 | 12/2009 | Pafumi |
| 2012/0066678 | A1* | 3/2012 | Pafumi et al. ..................... 718/1 |
| 2012/0110275 | A1* | 5/2012 | Ganti et al. .................... 711/153 |
| 2012/0303594 | A1* | 11/2012 | Mewhinney et al. ......... 707/692 |

* cited by examiner

*Primary Examiner* — Minh-Chau Nguyen
(74) *Attorney, Agent, or Firm* — Yudell Isidore Ng Russell PLLC

(57) ABSTRACT

In a data processing system including a virtual I/O server (VIOS) cluster and multiple logical partitions (LPARs), at least one VIOS of the VIOS cluster performs functions of: receiving first registration information from one or more entities within the VIOS cluster; registering, based on the first registration information, a handler associated with a first message type; responsive to receiving second registration information, registering, based on the second registration information, a listener associated with a second message type; receiving a first message associated with a first alert event of the cluster; determining, based on the first message, that the handler is associated with the first message type; and calling the handler. In one embodiment, the handler is associated with a pointer to a subroutine, and registering the handler includes storing the pointer in a data structure that associates the handler with the first message type.

20 Claims, 9 Drawing Sheets

US 8,661,089 B2

VIOS CLUSTER ALERT FRAMEWORK

BACKGROUND

1. Technical Field

The present invention relates in general to distributed data processing systems and in particular to messaging within a cluster of virtual input/output servers. Still more particularly, the present invention relates to a method, data processing system and computer program product that provides registration of handlers and listeners associated with message types within a cluster of virtual input/output servers.

2. Description of the Related Art

Virtualized data processing system configurations, which provides the virtualization of processor, memory and operating system (OS) resources are becoming more and more common in the computer (and particularly the computer server) industry. In the past, clustering was implemented on a hardware level without regard for a cluster of virtual input/output (I/O) servers (VIOSes) that are utilized to provide I/O services to one or more logical partitions (LPARs). As such, a cluster aware virtual I/O server (VIOS) architecture needs an ability to respond to events of the cluster of VIOSes before one or more failures in operation of one or more client LPARs can occur.

BRIEF SUMMARY

Disclosed are a method, data processing system, and a computer program product that receives registration information to register either a handler (e.g., a process) to be called (e.g., performed or invoked) or a listener (e.g., a system or process) in association with a message type and calling the handler or sending information to the listener when a message associated with the message type is received, according to one or more embodiments. In one example, first registration information that includes information associated with a handler and a first message type is received, and the handler is registered in a data structure associated with the first message type. For instance, when a message associated with the first message type is received, the handler is called (e.g., performed or invoked). In another example, second registration information that includes information associated with a listener and a second message type is received, and the listener is registered in a data structure associated with the second message type. For instance, when a message associated with the second message type is received, information (e.g., information from the message, information from a configuration, information from a database, etc.) can be sent to the listener. In one or more embodiments, the messages can be associated with alert events corresponding to a cluster of virtual input/output (I/O) servers (VIOSes) that are utilized to provide I/O services to one or more logical partitions (LPARs). In one example, the alert events indicate one or more statuses of the cluster of VIOSes such as one or more of "pool up", "pool down", "threshold exceeded", "node down", "node up", and one or more customizable statuses. In another example, the alert events are recorded in a journal or database.

In one or more embodiments, a method, data processing system, and a computer program product establishes cluster-awareness for a VIOS created within an OS partition of a computing electronic complex within the data processing system. One embodiment provides a computing electronic complex (CEC) comprising: a processor; one or more physical input/output (I/O) adapters that support I/O communication with an external network; and a memory coupled to the one or more processors and having a virtualization management component that supports creation of and communication between one or more virtualized operating system (OS) partitions. The memory also includes at least one operating system (OS) partition, including a first virtual input/output (I/O) server (VIOS) partition having a cluster-aware (CA) OS that executes on a virtual processor resource of the VIOS. When executed the CA_OS performs the function of registering the first VIOS with a VIOS cluster comprising at least a second VIOS. The registering of the first VIOS to the VIOS cluster enables the first VIOS to receive cluster specific data to make the first VIOS aware of the VIOS cluster, and the first VIOS is thus able to communicate information with other VIOSes within the VIOS cluster.

The above summary includes simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
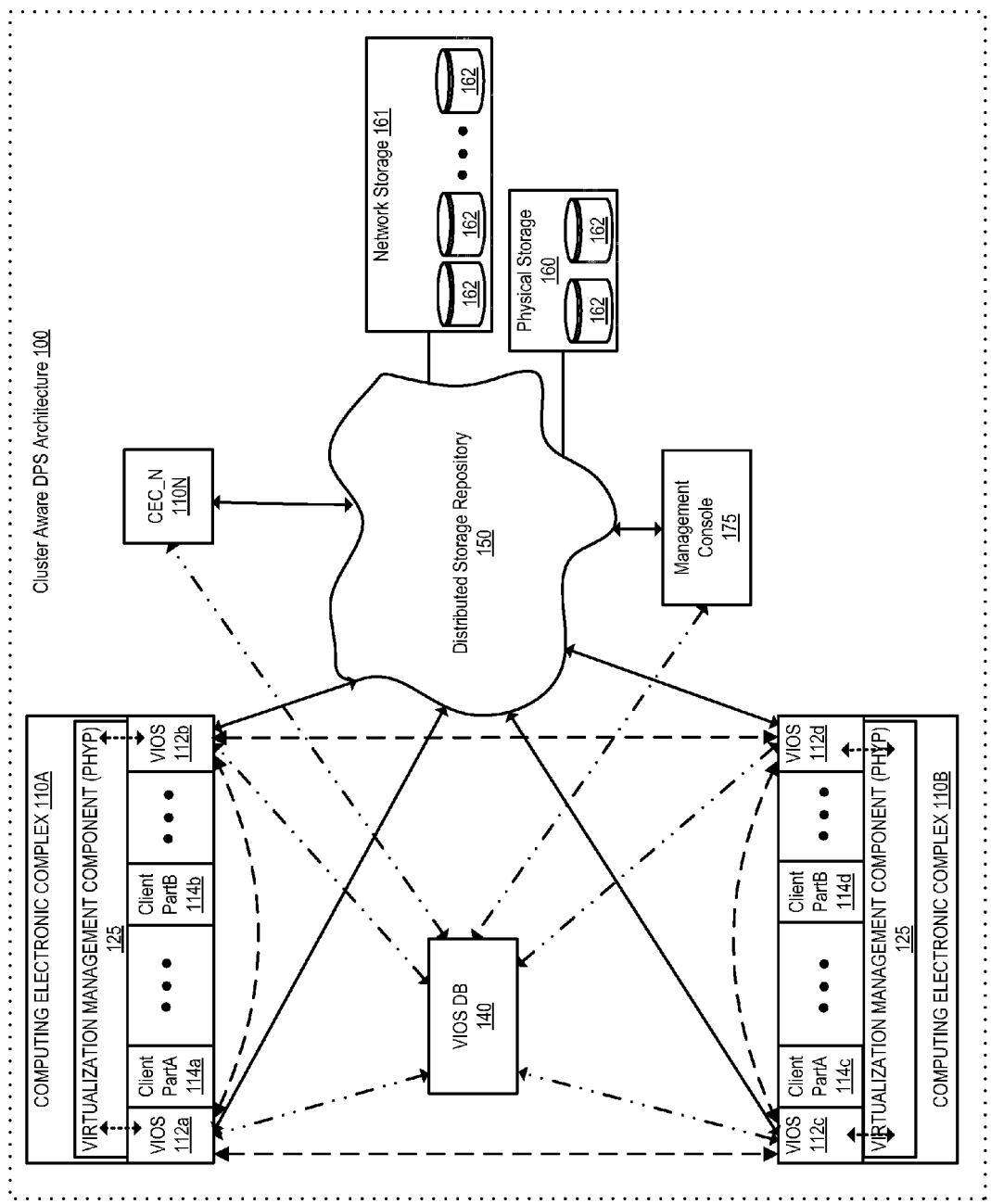
FIG. 1A illustrates a first view of a cluster (aware) data processing system within which various of the functional features of the described embodiments are implemented, according to one embodiment.

The illustrative embodiments provide a method, data processing system, and a computer program product that receives registration information to register either a handler to be called or a listener in association with a message type and calling the handler or sending information to the listener when a message associated with the message type is received. In one embodiment, a message conveys an alert event that is associated with an asynchronous change in a state of an object associated with a cluster. For example, one or more of a utility executing on a computing electronic complex (CEC), an application executing on a CEC, and hardware included in the CEC monitors one or more of failures (e.g., application failures, utility failures, hardware failures, network failures, etc.), process-related statuses, and resource-related statuses, among others, to generate and send the message that conveys the alert event. For instance, the message that conveys the alert event includes one or more of a predictive failure warning, a hardware failure, a process-related event (e.g., an application initiation, an application exit or end, an application failure, etc.), and a resource-related event (e.g., excessive page swapping, an overloaded CPU, shortage of disk or storage space, excessive network utilization, network failure, I/O request queue length exceeded, excessive processor time, etc.), among others.

In one example, first registration information that includes information associated with a handler and a first message type is received, and the handler is registered in a data structure associated with the first message type. For instance, when a message associated with the first message type is received, the handler is called (e.g., performed or invoked). In another example, second registration information that includes information associated with a listener and a second message type is received, and the listener is registered in a data structure associated with the second message type. For instance, when a message associated with the second message type is received, information (e.g., information from the message, information from a configuration, information from a database, etc.) can be sent to the listener. In one or more embodiments, the messages can be associated with alert events corresponding to a cluster of virtual input/output (I/O) servers (VIOSes) that are utilized to provide I/O services to one or more logical partitions (LPARs). In one example, the alert events indicate one or more statuses of the cluster of VIOSes such as one or more of "pool up", "pool down", "threshold exceeded", "node down", "node up", one or more customizable statuses. In another example, the alert events are recorded in a journal or database.

The illustrative embodiments also provide a method, data processing system, and computer program product that establishes cluster-awareness for a Virtual Input/Output (I/O) Server (VIOS) created within an operating system (OS) partition of a computing electronic complex within the data processing system. A first cluster-aware (VIOS) is provided within an OS partition by execution of a cluster-aware (CA) OS on a virtual processor resource of the first VIOS. The CA OS establishes the VIOS as a cluster-aware VIOS by registering the first VIOS with a VIOS cluster comprising a second VIOS. Registering the first VIOS to the VIOS cluster enables the first VIOS to receive VIOS cluster configuration data and status data, which provides the first VIOS with information about the other VIOSes within the VIOS cluster. The first VIOS is thus able to communicate with other VIOSes within the VIOS cluster and share I/O resources with the other VIOSes within the VIOS cluster. Relevant cluster information is stored within a local storage of the first VIOS.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and sub-headings are presented within the specification:

A. General Architecture
    B. Cluster-Aware VIOS
    C. VIOS API Communication Infrastructure
    D. VIOS Shared DB for Cluster Management
    E. Alert Framework for a Cluster of VIOSes A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
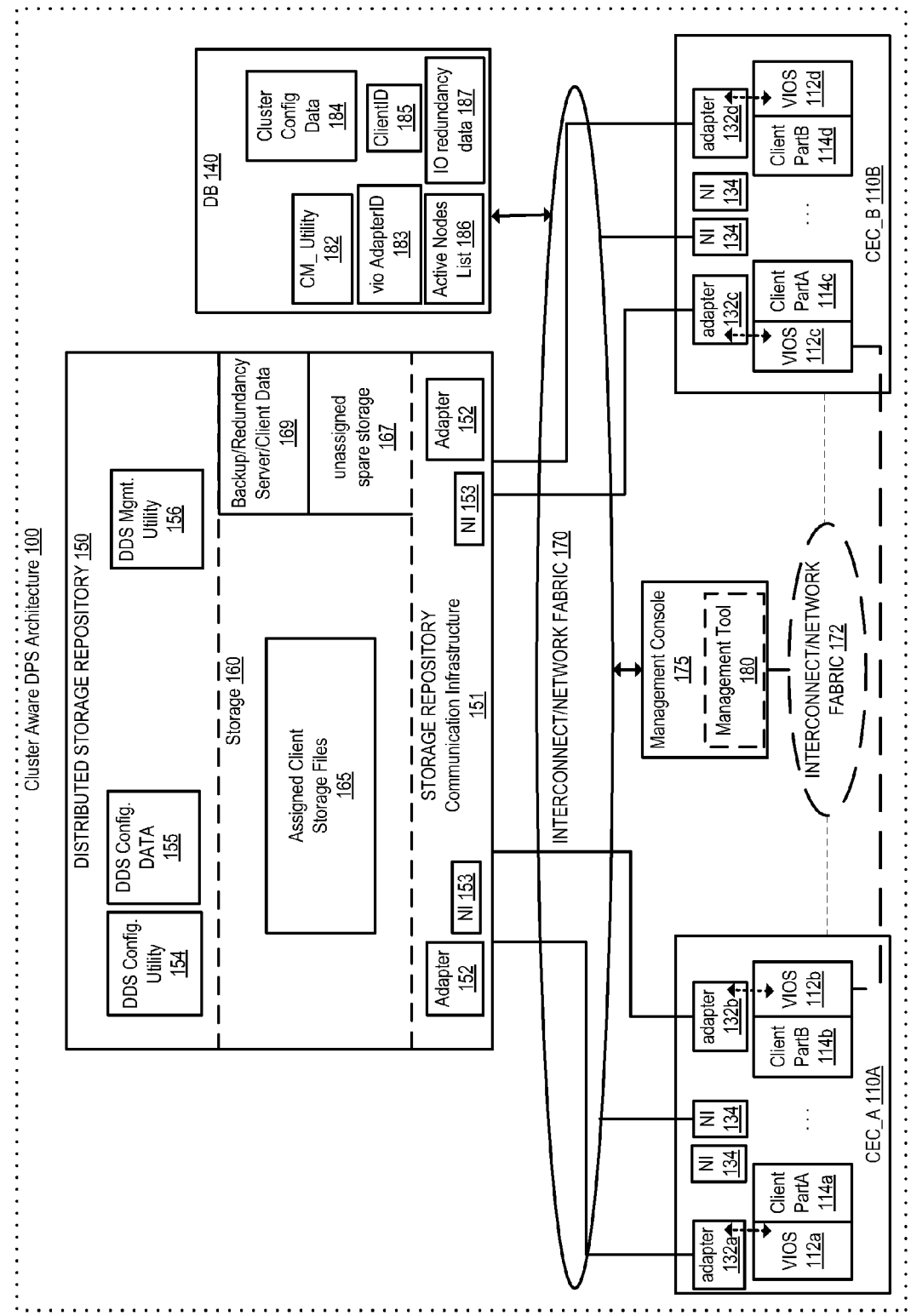
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of the component make-up of an example distributed storage repository 150 and an initial listing of some components of DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

As shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various embodiments.

These various data structures are created, maintained and/or updated, and/or deleted by the various operations of one or more of the processing components. In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster.

Figure 2:
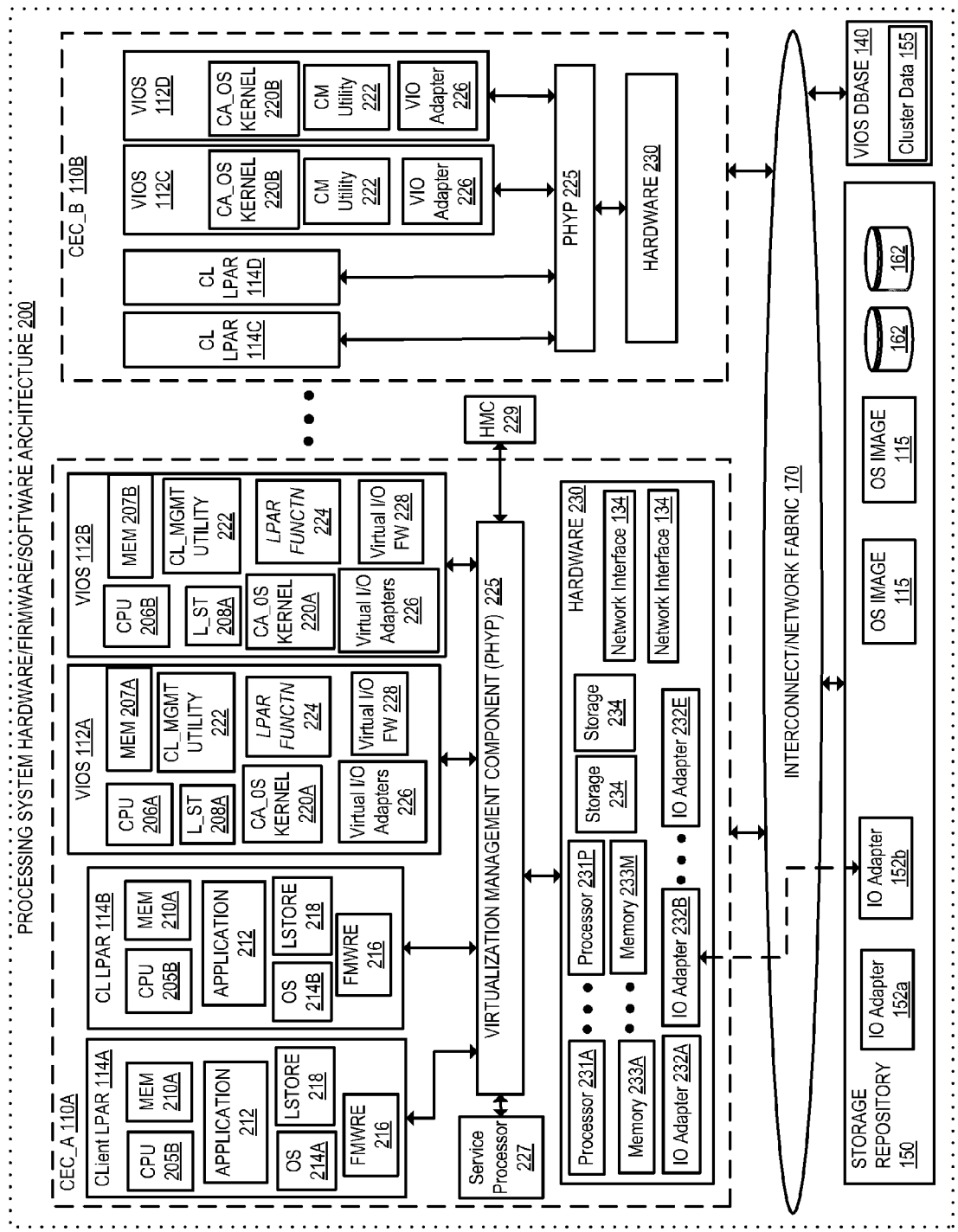
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification. As described in greater detail below and with reference to FIG. 3, one of OS 220 or CM utility 222 comprises or provides the functionality of an alert framework utility (AFU) 620A1, which comprises several individual components/utilities defined in Section E below.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. CA VIOS Communication Protocol

One embodiment provides a communication protocol that enables efficient communication between the Clients 114 and distributed storage repository 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed storage repository 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed storage repository 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 4:
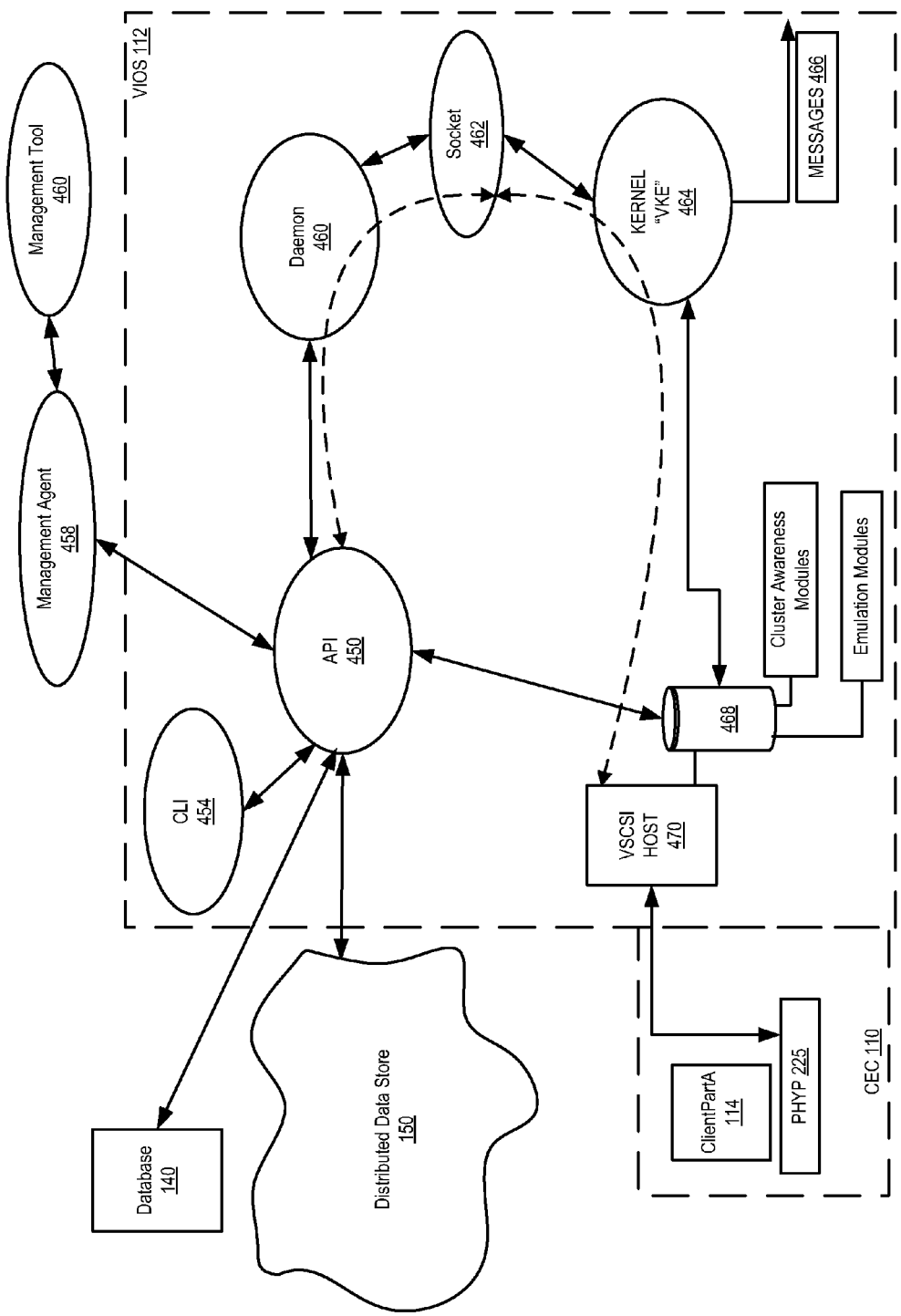
FIG. 4 illustrates a VIOS communication infrastructure with an application programming interface (API) controlling messaging and communication of VIOS components and other devices within the DPS, according to one embodiment.

Referring now to FIG. 4, there is illustrated an example VIOS communication infrastructure having an application programming interface (API) controlling the various exchanges between XML components over a virtual Small Computing Systems Interface (vSCSI) topology. Central to the Cluster/VIOS communication paradigm is a plurality of APIs, of which API 252 is provided in the illustrative embodiment. The VIOS API 450 is utilized to manage objects within a VIOS cluster. The API 450 includes the necessary information about how to connect to and/or exchange information with internal VIOS functional modules as well as with DB 140, DDS 150 and management tool 460. In one embodiment, management tool 260 is implemented within a cluster aware server module and includes server management sub-agents 258, which represents the structures utilized by the managing tool to communicate with the operating system. The internal functional modules within VIOS 112 comprises command line interface (CLI 454), Daemon 460, socket 462, kernel extension (vKE) 464, and vSCSI host 470. The vSCSCI host 470 includes the enhancements to VIOS 112 that enable the cluster aware functionality. These enhancements are illustrated as a connected block structure 468, by which advanced VIOS operations and emulation are provided, as described in greater detail below. VIOS 112 with its various internal components is connected within CEC 110 via PHYP 225, as previously illustrated by FIG. 2, described above.

Each component that connects with API 450 and makes one or more requests through API 450 is generally referred to as a "caller" throughout this specification. As presented by the figure, any one or management tool 460 (via management agent 458), CLI 454, Daemon 460, and vSCSI host 470 may be a caller requesting specific types of information exchange via API 450. In one embodiment, the API 450 comprises an XML interface as well as a C programming language interface. The various "callers" use the VIOS API 450 to initiate actions on these objects. Some actions may change the state of one or more objects in the VIOS cluster. The VIOS API 450 may be used by multiple callers at any given time. While callers are not aware of other callers using the VIOS API 450 and do not have the ability to notify all callers of actions that they initiate, the VIOS API event notification protocol provides cluster level awareness of caller modifications to prevent data contamination during processing of multiple caller requests. Callers that need awareness of actions taken on VIO objects are able to register for event notification and receive notification about changes to VIO objects that occur within the cluster. The callers then utilize the notifications as a trigger to go to the shared storage (DB 140) and retrieve the necessary information from the shared VIOS cluster DB 140 to keep the caller's locally stored VIO object data current. Additionally, in one embodiment, VIOS API event notification provides participating callers with results to actions that have occurred on one or more VIO objects. As described herein, these VIO object events are categorized as Lifecycle events or Alert events.

In one embodiment, to decrease the amount of APIs required be each consumer, only a few high level APIs are exposed. Each API provides various actions on an object by object basis. Interaction between the API 450 and a consumer (a caller receiving data in response to a requestor a caller registered to receive notification of an event) is performed by the consumer providing a VIO request extensible markup language (XML) buffer with sufficient amount of data provided in order for the request to be processed. Once the request has been processed, a VIO response XML steam is written back to the caller for response processing. When the response indicates a successful processing of the request, the XML steam contains the status and the requested object information that is needed. However, if the request fails, the response XML stream contains VIO exception information. The common format of each object API is to provide a vioRequest structure that contains the required information needed for request processing.

Returning to FIG. 4, in the illustrative embodiments, a VIOS 112 emulates SCSI devices using a kernel extension (vscsi host kernel extension kernel extension) in the VIOS partition (which also includes the code/modules for providing VCSI host 470 and Daemon 460). VSCSI host 470 includes one or more driver(s) and sub-driver(s), which provide separate functions. A first set of drivers provides emulation functionality, while other drivers provide transport and messaging functionality. VSCSI host 470 includes VIOS enhanced operational functionality, illustrated via additional structure 4 coupled to VSCSI host 470. Structure 468 includes software modules that enable the various messaging structures used for implementing VIOS cluster awareness functionality and VIOS/Client emulation. Client 114a logs into the VIOS 112 as part of the transport layer protocol. At the time the client 114a logs into the VIOS 112, the PHYP 125 provides information to the VIOS 112 regarding the identity (ID) of the client 114a relative to the CEC 110. The VKE 264 services SCSI requests sent by the VIOS 112 through a transport layer supported by PHYP 225. The kernel code does not complete the login request until the VKE 464 sends a message with the CEC-relative client ID using a socket 462 to Daemon 460, which is also running on the VIOS 112. VKE 464 also transmits other messages 466 within the cluster environment. The user daemon 460 has access through API 450 to Database (DB) 140, which is maintained by all VIOS partitions servicing the client(s) within the cluster.

D. VIOS Shared DB for Cluster Management

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the local OS cache (local storage) data entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

Figure 5:
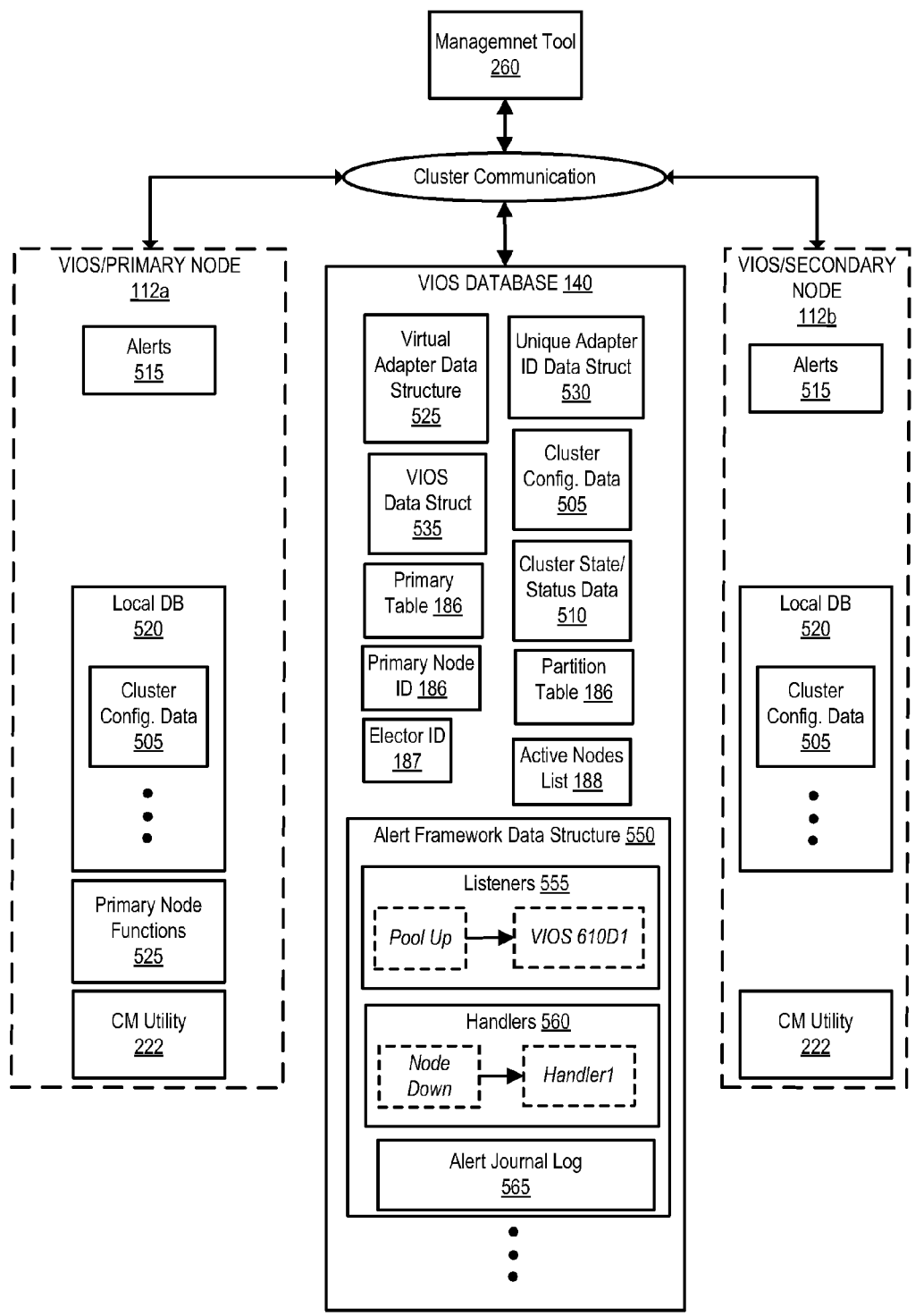
FIG. 5 is a block diagram representation of stored data structures and other functional components within a VIOS DB including primary node election components, which enable cluster level information/data management and exchange between a management tool, a primary node, secondary node and the shared database, according to one embodiment.

FIG. 5 is a block diagram representation of functional components of a primary node, a secondary node and shared storage (DB 140) to enable cluster level information/data storage, management and exchange between the nodes and VIOS shared storage (DB 140). In one embodiment, a local copy of (relevant data of) DB 140 is shared by each VIOS within the cluster and stored in respective local DB 520. Each VIOS is then responsible for storing, maintaining and updating the data structures at DB 140 in one embodiment.

As illustrated by FIG. 5, DB 140 is accessible to the various VIOS nodes 112 and to management tool 405 via cluster communication fabric. Database 140 comprises several different modules of data, which may be arranged in a plurality of formats (e.g., tables, raw data, sequenced data, etc.). According to the figure, DB 140 includes a virtual adapter data structure 525, which maintains a listing of and configuration information about the virtual adapters. DB 140 also includes a second data structure 530 that holds the unique adapter identifiers (AdapterIDs), and is therefore referred to herein as AdapterID data structure 530. DB 140 maintains a listing of and information about the VIOSes within a VIOS data structure 535. In one or more embodiments, each of the described data structures 525-535 can be or can include a table within DB 140. When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique.

In one or more embodiments, adapter names are unique per CEC 110, and where VIOS partitions are not "mobile" (i.e., do not move from a first CEC to a second CEC), the adapter names can be identified using a CEC, name tupple. When a VIOS 112 is first configured, the VIOS downloads from DB 140 a copy of cluster configuration data 505 and cluster state/status data 510 from VIOS DB 140. VIOS DB 140 may comprise a plurality of additional data structures and/or components, some of which are illustrated within VIOS DB 140, but are not germane to the description of the embodiments presented herein.

As illustrated, DB 140 includes an alert framework data structure 550 that includes listeners 555 and handlers 560 and an alert journal log 565 In one or more embodiments, a registration utility of one or more of a VIOS, DB 140 or management console 180 processes information and modifies listeners 555 and handlers 560. As illustrated, a "pool up" message type of listeners 555 indicates a notification of VIOS 610D1 (FIG. 6), and a "node down" message type of handlers 560 indicates a call to a Handler1. In one example, the listener of VIOS 610D1 within listeners 555 includes one or more of a network address and a port number that are usable to send one or more messages associated with the message type (e.g., "pool up"). In another example, a process can be considered a "handler" for an alert event conveyed in a message associated with a message type. For instance, a handler is called to perform or invoke a process that was registered in association with a message type. For example, a message associated with a "node down" message type is received, and a handler is called to respond to the "node down" alert event conveyed in the message. For instance, the message associated with the "node down" message type corresponds to VIOS node 610D1 changing a status to "node down", and a handler is called to perform an election process to elect another primary notification node.

E. Alert Framework for a Cluster of VIOSes

Figure 6:
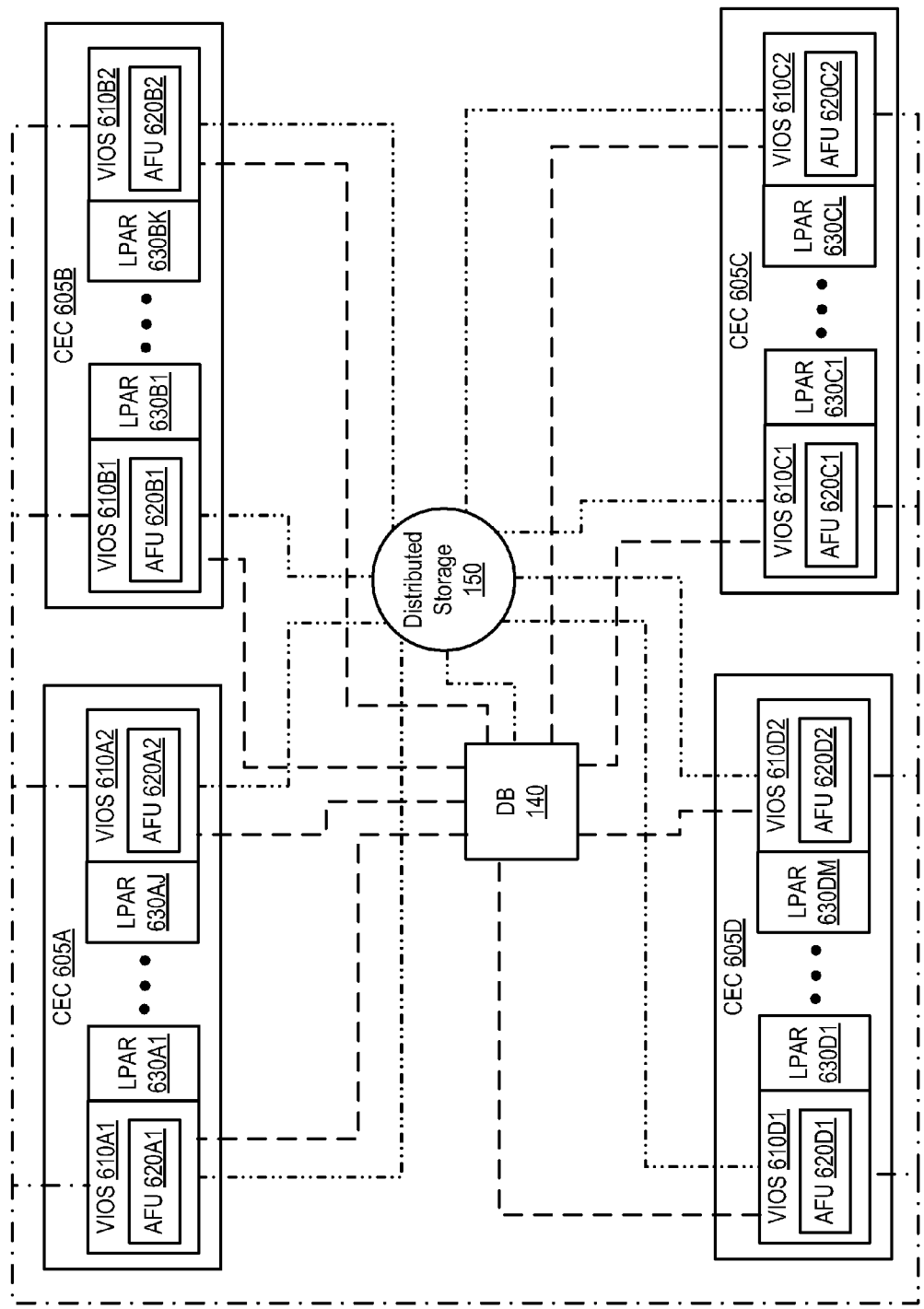
FIG. 6 is a block diagram of a cluster of virtual input/output servers, according to one or more embodiments.

Turning now to FIG. 6, a block diagram of a different view of a cluster of VIOSes is illustrated, according to one or more embodiments. As shown, the VIOS cluster can include two or more VIOS partitions, such as VIOSes 610A1-610D2, and each of VIOSes 610A1-610D2 is communicatively coupled to (i.e., able to communicate with) another of VIOSes 610A1-610D2. As illustrated, a first CEC 605A can include VIOSes 610A1 and 610A2 and client LPARs 630A1-630AJ for some integer number J; a second CEC 605B can include VIOSes 610B1 and 610B2 and client LPARs 630B1-630BK for some integer number K; a third CEC 605C can include VIOSes 610C1 and 610C2 and client LPARs 630C1-630CL for some integer number L; and a fourth CEC 605D can include VIOSes 610D1 and 610D2 and client LPARs 630D1-630DM for some number M. In one or more embodiments, each of CECs 605A-605D includes one or more structures and/or functionalities described with reference to CEC 110A (FIGS. 1A-1B and 2).

As shown, VIOSes 610A1-610D2 includes alert framework utilities (AFUs) 620A1-620D2, respectively. In one or more embodiments, each of VIOSes 610A1-610D2 includes one or more structures and/or functionalities described with reference to VIOS 112. For example, VIOS 610A1 includes a VIOS daemon (viosd) 460 (FIG. 4), and viosd 460 can include alert framework utility (AFU) 620A1. As illustrated, each of VIOSes 610D1 and 610D2 is communicatively coupled to VIOS DB 140 and is also communicatively coupled to distributed storage 150. VIOS DB 140 can also be coupled to distributed storage 150. In one embodiment, VIOS DB 140 is a computer system that includes a database management system. For example, DB 140 includes one of a solidDB database, an Oracle database, a DB/2 database, a SQL Server database, a SQLite database, a PostgreSQL database, or a MySQL database, among others, as the database management system.

In one or more embodiments, the clustered VIOSes 610A1-610D2 are associated multiple statuses, and messages are utilized and communicated to convey one or more of the multiple statuses associated with the VIOS cluster (e.g., statuses associated with the cluster, configurations of the cluster, one or more processor pools, CECs 605A-605D, VIOSes 610A-610D2, connectivity to VIOS DB 140, connectivity to distributed storage 150, etc.). In one embodiment, the messages convey alert events that are associated with an asynchronous change in a state of an object associated with the cluster. For example, one or more of a utility executing on a CEC, an application executing on a CEC, and hardware included in the CEC monitors one or more conditions from among failures (e.g., application failure, utility failure, hardware failure, network failure, etc.), process-related statuses, and resource-related statuses, among others, to generate and send the messages that convey alert events. For instance, the messages that convey alert events include one or more of predictive failure warnings, hardware failures, process-related events (e.g., an application initiation, an application exit or end, an application failure, etc.), and resource-related events (e.g., excessive page swapping, an overloaded CPU, shortage of disk or storage space, excessive network utilization, network failure, I/O request queue length exceeded, excessive processor time, etc.), among others.

In one example, VIOS 610B1 functions within the cluster and can be associated with a status of "node up". For instance, when a status of VIOS 610B1 changes to "node up", a message is communicated in the cluster that informs one or more of DB 140 and the other VIOSes, VIOSes 610A1, 610A2, and 610B2-610D2, to indicate that VIOS 610B1 has a status of "node up". In a second example, VIOS 610C1 is nonfunctional (i.e., not operational) within the cluster and can be associated with a status of "node down". For instance, when a status of VIOS 610C1 changes or is determined to be "node down", a message is communicated in the cluster that informs one or more of DB 140 and VIOSes 610A1-610B2 and 610C2-610D2 to indicate that VIOS 610C1 has a status of "node down". In another example, the one or more statuses can include one or more of "pool up", "pool down", "threshold exceeded", and other customizable statuses.

In one embodiment, AFUs 620A1-620D2 monitors status messages associated with the cluster. In one example, VIOS 610A1 is elected as the primary node of the cluster, and AFU 610A1 monitors messages of the cluster for one or more messages associated with statues "pool up", "pool down", and "threshold exceeded", among others. In another example, each of AFUs 620A1-620D2 monitors messages in the cluster for one or more messages associated with statues "node up" and "node down", among others.

In one embodiment, one or more of AFUs 620A1-620D2 provide detection and/or determination of one or more events/issues (e.g., problems) that may disrupt operation of one or more client LPARs 630A1-630DM. For example, one or more change of statuses may cause one or more failures in operation of one or more client LPARs 630A1-630DM. For instance, the one or more changes of statuses that may cause one or more failures include "pool down", "node down", and "threshold exceeded", among others. In one embodiment, detecting and/or determining of the one or more issues, utilizing one or more of AFUs 620A1-620D2, provides a method and/or system with an ability to address, respond, and/or correct the one or more issues before one or more failures in operation of one or more client LPARs 630A1-630DM can occur.

For example, a first VIOS node (e.g., VIOS 610A1 or 610C1) of the cluster detects and/or determines that a second VIOS node (e.g., VIOS 610C2) of the cluster has changed a status to "node down" (e.g., utilizing AFUs 620A1 or AFU 620C1 or another AFU within the cluster), and the first VIOS 610A1/610C1 reconfigures itself (or is reconfigured) to provide one or more functionalities and/or services that were previously provided by the second VIOS 610C2. For instance, the detection and/or determination that the second VIOS 610C2 of the cluster has changed a status to "node down" (e.g., not functioning) provides the first VIOS 610A1/610C1 with an ability to provide one or more services to one or more client LPARs (114) that were being provided by the second VIOS node. In one embodiment, the switchover to the first VIOS 610A1/610C1 to provide the services to the client LPARs occurs before a failure in operation of the one or more client LPARs can occur. In one example, configuring the first VIOS 610A1/610C1 to provide the one or more services (previously provided by the second VIOS) to the one or more LPARs involves calling a handler to inform and/or configure first VIOS 610A1/610C1 to provide the one or more services to one or more LPARs 630C1-630CL. In another example, providing the one or more services to the one or more LPARs 630C1-630CL that were being provided by the second VIOS 610C2 includes migrating one or more LPARs 630C1-630CL to one or more other CECs (e.g., one or more of CECs 605A, 605B and 605D).

In one or more embodiments, two VIOS nodes of the cluster utilize and/or manage messages associated with alert events. For example, two nodes of the cluster can be elected to utilize and/or manage messages associated with alert events. For instance, VIOSes 610A1 and 610D1 are elected and utilize and/or manage messages associated with alert events. In this instance, VIOSes 610A1 and 610D1 can be, respectively, a primary notification node and a primary cleanup node. In one embodiment, the two VIOS nodes (e.g., nodes 610A1 and 610D1) are elected in an election process that supports primary VIO nodes.

In one example of an election, VIOS 610A1 is elected as a primary cleanup node that utilizes and/or manages messages associated with alert events and stores the alert events in an alert journal log 565 of DB 140 (or distributed storage 150). In one embodiment, VIOS 610A1 is elected as a primary cleanup node after an elector node determines that VIOS 610A1 is a member of the cluster, VIOS 610A1 includes an ability to store information in distributed storage 150, and/or VIOS 610A1 includes an ability to access a cluster database (e.g., DB 140). In a second example of an election, an elector node elects VIOS 610D1 as a primary notification node that utilizes and/or manages messages associated with alert events and sends and/or posts messages associated with these events to the VIOSes of the cluster.

Figure 3:
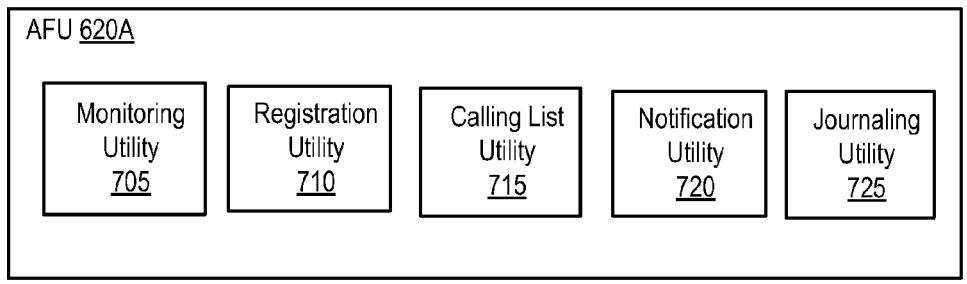
FIG. 3 is a block diagram of an alert framework utility, according to one or more embodiments.

Turning now to FIG. 3, a block diagram of an alert framework utility is illustrated, according to one or more embodiments. As illustrated, AFU 620A1 includes monitoring utility 705, registration utility 710, calling list utility 715, notification utility 720, and journaling utility 725. In one or more embodiments, one or more of AFUs 620A2-620D2 can include one or more of same or similar structures and/or functionalities as described with reference to AFU 620A1.

In one or more embodiments, monitoring utility 705 monitors messages associated with alert events. For example, monitoring utility 705 is configured to monitor types of events. For instance, one or more types of events can include one or more of "node up", "node down", "pool up", "pool down", and "threshold exceeded", among others. In one embodiment, monitoring utility 705 filters messages based on a message type. For example, a monitor utility of AFU 620C1 monitors messages associated with message types of one or more of "node up" and "node down" while a monitor utility of AFU 620A1 monitors messages associated with message types of one or more of "pool up", "pool down", and "threshold exceeded".

In one or more embodiments, registration utility 710 receives information associated with a message type (e.g., an alert type) and a process that is to be performed or invoked in response to a message associated with the message type. For example, the process can be considered a "handler" for an alert event conveyed in a message associated with a message type. In one or more embodiments, registration utility 710 receives information associated with a message type (e.g., an alert type) and an object (e.g., a process executing on a system) or a system that is to be notified in response to a message associated with the message type. For example, the object or system can be considered a "listener" for an alert event conveyed in a message associated with a message type.

Generally, an entity/application within the CA DPS 100 registers with the alert framework to consume messages of a specific type. Thus, the different entities may consume a same type message or different type messages and the actual consumption is determined by the registration parameters provided by the entity upon registration with the alert framework. In one example, a VIOS registers with a primary notification node via registration utility 710 to be notified with information when a message associated with the message type is received. For instance, a VKE of the VIOS registers with the primary notification node via registration utility 710 to be notified with information when a message associated with the message type is received. In a second example, a database (e.g., DB 140) or an entity (e.g., management console) registers with a primary notification node via registration utility 710 to be notified with information when a message associated with the message type is received. For instance, DB 140 stores the notification information for a VIOS node of the cluster that becomes a new primary node after status of a former primary node has changed to "node down". In another example, an application or utility registers with a primary notification node via registration utility 710 to be notified with information when a message associated with the message type is received.

In one or more embodiments, calling list utility 715 receives a message associated with a message type and calls a handler to perform or invoke a process that was registered in association with the message type. For example, calling list utility 715 receives a message associated with a "node down" message type, and calling list utility 715 calls a handler to respond to the "node down" alert event conveyed in the message. For instance, the message associated with the "node down" message type corresponds to VIOS node 610D1 changing a status to "node down", and a handler is called by calling list utility 715 to perform an election process to elect another primary notification node.

In one or more embodiments, notification utility 720 provides information to a listener (e.g., an object or system) in response to a message associated with a message type. In one example, notification utility 720 notifies a VIOS with information when a message associated with the message type is received. For instance, a VKE of the VIOS is notified with information when a message associated with the message type is received. In a second example, notification utility 720 notifies a database (e.g., DB 140) with information when a message associated with the message type is received. For instance, notification utility 720 inserts and/or updates data of one or more rows of DB 140. When that data is updated, the notification utility also alerts the other nodes that are registered to receive notification of the update and the other nodes can access the DB 140 to retrieve the updated data.

In one or more embodiments, journaling utility 725 stores and/or records a journal of one or more the messages received by AFU 620A1. In one example, journaling utility 725 stores and/or records a journal of all messages received by AFU 620A1. In another example, monitoring utility 705 filters messages based on one or more message types, and journaling utility 725 stores and/or records a journal of a portion of messages received by AFU 620A1. In one embodiment, the journal is stored and/or recorded in alert journal log 565 within DB 140. In an alternate embodiment, the journal is stored and/or recorded in distributed storage 150.

Figure 7A:
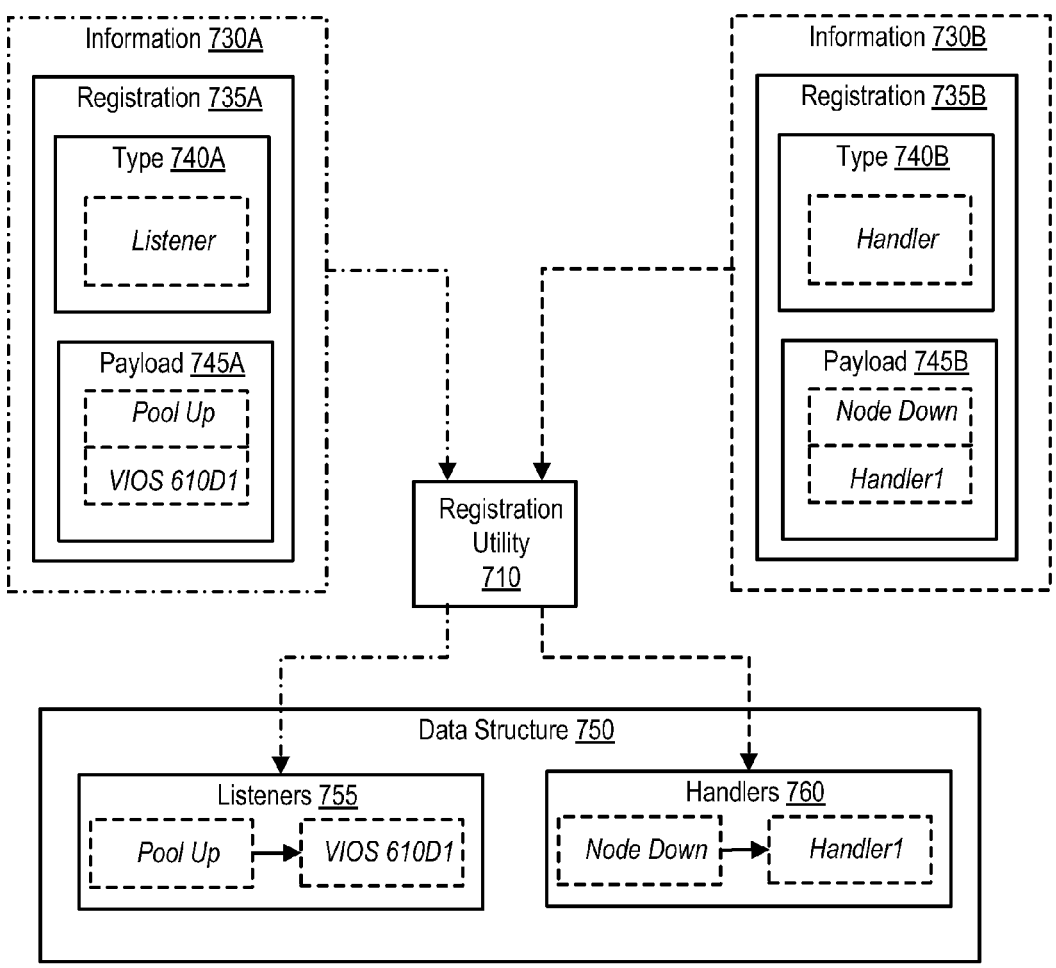
FIG. 7A is a block diagram of a registration utility receiving and processing information, according to one or more embodiments.

Turning now to FIG. 7A, a block diagram of a registration utility receiving and processing information is illustrated, according to one or more embodiments. As shown, registration utility 710 receives information 730A and 730B that includes registrations 735A and 735B, respectively. As illustrated, registrations 735A and 735B include respective types 740A and 740B and include respective payloads 745A and 745B. As shown, type 740A includes a listener type, and payload 745A includes a message type of "pool up" and a listener of VIOS 610D1. As illustrated, type 740B includes a handler type, and payload 745B includes a message type of "node down" and a handler of Handler1. In one embodiment, Handler1 is a pointer to a function or subroutine.

In one or more embodiments, registration utility 710 processes information 730A and 730B and modifies listeners 755 and handlers 760 of data structure 750. As illustrated, a "pool up" message type of listeners 755 indicates a notification of VIOS 610D1, and a "node down" message type of handlers indicates a call to Handler1. In one embodiment, data structure 750 is stored in a memory associated with or of a VIOS. In another embodiment, data structure 750 is stored in a database (e.g., DB 140). For example, alert framework data structure 550 of DB 140 (FIG. 5) can include data structure 750, and listeners 555 and handlers 560 can include listeners 755 and handlers 760, respectively.

Figure 7B:
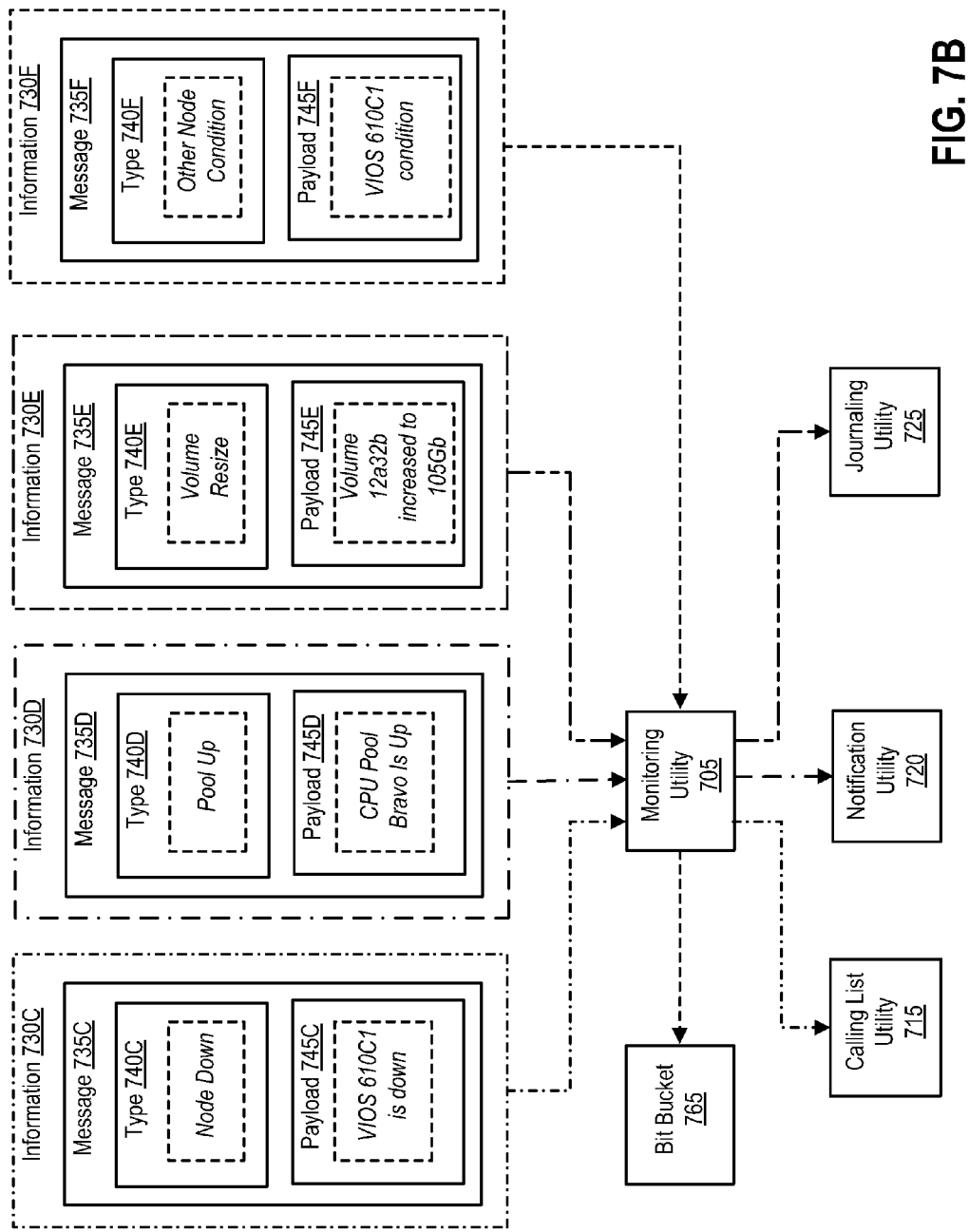
FIG. 7B is a block diagram of a monitoring utility receiving and processing information, according to one or more embodiments.

Turning now to FIG. 7B, a block diagram of a monitoring utility receiving and processing information is illustrated, according to one or more embodiments. As shown, monitoring utility 705 receives information 730C-730F that includes messages 735C-735F, respectively. As illustrated, messages 735C-735F include respective types 740C-740F and include respective payloads 745C-745F.

In one or more embodiments, monitoring utility 705 filters messages based on message types. For example, monitoring utility 705 filters messages 735C-735F based on respective message types 740C-740F and routes messages 735C-735F to one or more appropriate utilities 715-725 and/or bit bucket 765. For instance, monitoring utility 705 accesses data structure 750 to filter and/or route messages 735C-735F based on respective message types 740C-740F. As shown, monitoring utility routes messages 735C-735F to utilities 715-725 and bit bucket 765, respectively.

In one embodiment, information and/or a message routed to bit bucket 765 is discarded. In one example, bit bucket 765 can represent a method or process that discards information 730F. In one instance, the method or process that discards information 730F advances a pointer in a queue without copying or processing the data (e.g., message 735F) from the queue. In a second instance, the method or process that discards information 730F frees memory associated with and/or that stores information 730F. In another instance, the method or process that discards information 730F routes information 730F to an information consumer that discards information sent to the information consumer (e.g., /dev/null in a Unix or Unix-like operating system). In another example, bit bucket 765 can represent an information consumer that discards information sent to the bit bucket (e.g., /dev/null in a Unix or Unix-like operating system).

Figure 8:
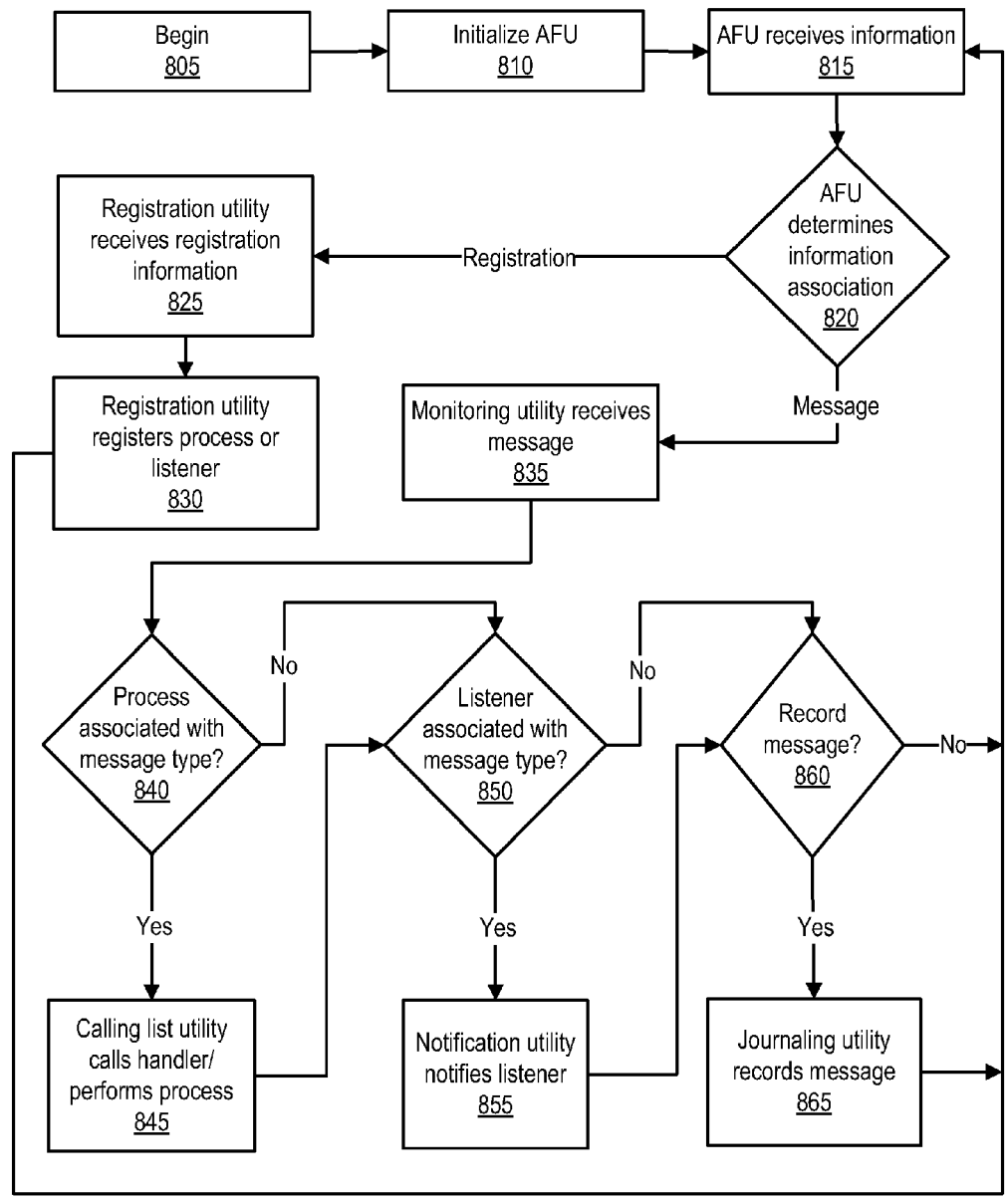
FIG. 8 provides a method of operating an alert framework utility, according to one or more embodiments.

Turning now to FIG. 8, a method of operating an alert framework utility is illustrated, according to one or more embodiments. The method begins at block 805 and proceeds to block 810, where AFU 620A1 is initialized. In one embodiment, AFU 620A1 is initialized with a default configuration and/or a configuration that is specific to AFU 620A1. In one example, AFU 620A1 retrieves the default configuration and/or the configuration that is specific to AFU 620A1 from one or more of distributed storage 150 and DB 140. In another example, a VIOS node of the cluster (e.g., VIOS 610A1) can initialize AFU 620A1 with the default configuration and/or the configuration that is specific to AFU 620A1. In one embodiment, AFU 620A1 is included in viosd 460, and AFU 620A1 is initialized when viosd 460 is initialized.

AFU 620A1 receives information at block 815 and determines an association of the received information at block 820. In one example, the received information is associated registration information. In another example, the received information is associated with a message that corresponds to an alert event. If the received information is associated with registration information, registration utility 710 of AFU 620A1 receives registration information at block 825. In one embodiment, the registration information is associated with a message type (e.g., an alert type) and a process that is to be performed or invoked in response to a message associated with the message type. For example, registration utility 710 of AFU 620A1 receives information 730B that is associated with a handler and a "node down" message type. In another embodiment, the registration information is associated with a message type (e.g., an alert type) and a listener that is to be notified in response to a message associated with the message type. For example, registration utility 710 of AFU 620A1 receives information 730A that is associated with a listener and a "pool up" message type.

At block 830, registration utility 710 registers the message type and the process that is to be performed or invoked in response to a message associated with the message type. Alternatively, at block 830 registration utility can register the listener that is to be notified in response to a message associated with the message type. In one example, registration utility 710 registers a "node down" message type and a process or handler of Handler1 in handlers 760 of data structure 750. In another example, registration utility 710 registers a "pool up" message type and a listener of VIOS 610D1 in listeners 755 of data structure 750. In one embodiment, the listener of VIOS 610D1 in listeners 755 includes one or more of a network address and a port number that are usable to send one or more messages associated with the message type (e.g., "pool up"). In one example, the network address is a network address of a CEC. In a second example, the network address is a network address of a VIOS (e.g., a VIOS of VIOSes 610A1-610D2). In another example, the port number is port number associated with a VKE or a VIOS daemon. The method proceeds to block 815 at which next information is received by the AFU.

If the received information is associated with a message, monitoring utility 705 of AFU 620A1 receives the message at block 835. In one embodiment, receiving the message can include queuing the message in a queue. At block 840, monitoring utility 705 determines whether or not a process or handler is registered for a message type that corresponds to the received message. If a process or handler is not registered for a message type that corresponds to the received message, the method proceeds to block 850.

If a process or handler is registered for a message type that corresponds to the received message, the method proceed to block 845 where calling list utility 715 calls (e.g., performs or invokes) the handler registered for the message type that corresponds to the received message (block 835). For example, the message type of message 735C may be "node down" and utility 715 determines that Handler1 is registered for the "node down" message type (block 840), and Handler1 is called and can use payload 745C (block 845). The method proceeds to block 850.

At block 850, monitoring utility 705 determines whether or not a listener is registered for a message type that corresponds to the received message. If a listener is not registered for a message type that corresponds to the received message, the method proceeds to block 860. If a listener is registered for a message type that corresponds to the received message, notification utility 720 provides the message to the listener and/or provides information associated with the received message to the listener at block 855. For example, the message type of message 735D is "pool up" and utility 720 determines that VIOS 610D1 is registered for the "pool up" message type (block 850), and notification utility 720 notifies VIOS 610D1 with message 735D or payload 745D (block 855). The method proceeds to block 860.

At block 860, monitoring utility 705 determines whether or not to record the received message. If the message is not to be recorded, the method can proceed to block 815. If the message is to be recorded, journaling utility 725 records and/or stores the message or information associated with the message in distributed storage 150 and/or DB 140, at block 865. For example, the message type of message 735E is "volume resize" and journaling utility 725 is programmed to record message 735E (block 860). Thus, journaling utility 725 stores and/or records message 735E or payload 745E (block 865).

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The specific embodiments presented herein provides a method, data processing system and computer program product that implements a VIOS alert framework within a VIOS cluster. Specifically, the method is implemented within a data processing system having one or more computing electronic complexes (CECs) that comprise a plurality of virtual input/output (I/O) servers (VIOSes) configured within a VIOS cluster, which has an associated VIOS database (DB) and provides I/O resources to a plurality of logical partitions (LPARs) executing within the one or more CECs. The method comprises a first VIOS of the VIOS cluster performing the functions of: receiving first registration information from a first functional entity of the VIOS cluster; registering, based on the first registration information, a handler associated with a first message type; receiving second registration information from a second functional entity of the VIOS cluster; registering, based on the second registration information, a listener associated with a second message type, where the listener corresponds to the second functional entity of the VIOS cluster; and in response to receiving a first message corresponding to a first alert event of the VIOS cluster, determining, based on characteristics of the first message, that the handler is associated with the first message; and calling the handler to perform a pre-established function of the handler. One embodiment of the method further comprise recording the first message within a journal that is maintained in one or more of the VIOS DB and a distributed storage repository accessible to at least the first VIOS of the VIOS cluster. Also the registering, based on the first registration information, the handler associated with the first message type includes storing a pointer to the handler in a data structure. Additionally, the registering, based on the second registration information, the listener associated with the second message type includes storing a network address associated with the listener in the data structure.

The method further comprises: receiving a second message associated with a second alert event of the VIOS cluster; determining, based on the second message, that the listener is associated with the second message; and notifying the listener with information corresponding to the second message. In one embodiment: the listener includes a network address of a second VIOS of the plurality of VIOSes; a third VIOS of the plurality of VIOSes provides one or more virtual I/O services to at least one of the plurality of LPARs; and the information corresponding to the second message indicates that the third VIOS is not functioning.

The method also comprises: the second VIOS receiving the information corresponding to the second message; and the second VIOS autonomously being reconfigured to provide the one or more virtual I/O services to the plurality of LPARs in response to receiving the information indicating that the second VIOS is not functioning. In one embodiment: one or more of the first message and the second message is associated with one or more status changes of at least one VIOS of the plurality of VIOSes, where the one or more status changes comprise a pool up, pool down, node up, node down, and threshold exceed. Also, the one or more of the first message and the second message convey alert events that are associated with an asynchronous change in a state of an object associated with the VIOS cluster, where the alert events are associated with one or more conditions from among failures detected within the VIOS cluster, process-related statuses, resource-related statuses.

In the flow charts above, one or more of the methods are implemented/embodied within a computer program product comprising a computer readable medium containing computer readable code/instructions such that a series of functions are completed/performed when the computer readable code/instructions is executed (by a processor/processing unit) on a computing device or machine. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having one or more computing electronic complexes (CECs) that comprise a plurality of virtual input/output (I/O) servers (VIOSes) configured within a VIOS cluster, which has an associated VIOS database (DB) and provides I/O resources to a plurality of logical partitions (LPARs) executing within the one or more CECs, a first VIOS of the VIOS cluster performing a method comprising:
   receiving first registration information from a first functional entity of the VIOS cluster;
   registering, based on the first registration information, a handler associated with a first message type;
   receiving second registration information from a second functional entity of the VIOS cluster;
   registering, based on the second registration information, a listener associated with a second message type, wherein the listener corresponds to the second functional entity of the VIOS cluster; and
   in response to receiving a first message corresponding to a first alert event of the VIOS cluster, determining, based on characteristics of the first message, that the handler is associated with the first message; and calling the handler to perform a pre-established function of the handler.

2. The method of claim 1, further comprising:
   receiving a second message associated with a second alert event of the VIOS cluster;
   determining, based on the second message, that the listener is associated with the second message; and
   notifying the listener with information corresponding to the second message.

3. The method of claim 2, wherein:
   the listener includes a network address of a second VIOS of the plurality of VIOSes;
   a third VIOS of the plurality of VIOSes provides one or more virtual I/O services to at least one of the plurality of LPARs; and
   the information corresponding to the second message indicates that the third VIOS is not functioning.

4. The method of claim 3, further comprising:
   the second VIOS receiving the information corresponding to the second message; and
   the second VIOS autonomously being reconfigured to provide the one or more virtual I/O services to the plurality of LPARs in response to receiving the information indicating that the second VIOS is not functioning.

5. The method of claim 1, further comprising recording the first message within a journal that is maintained in one or more of the VIOS DB and a distributed storage repository accessible to at least the first VIOS of the VIOS cluster.

6. The method of claim 1, wherein:
   registering, based on the first registration information, the handler associated with the first message type includes storing a pointer to the handler in a data structure; and
   registering, based on the second registration information, the listener associated with the second message type includes storing a network address associated with the listener in the data structure.

7. The method of claim 1, wherein:
   one or more of the first message and the second message is associated with one or more status changes of at least one VIOS of the plurality of VIOSes, wherein the one or more status changes comprise a pool up, pool down, node up, node down, and threshold exceed; and
   the one or more of the first message and the second message convey alert events that are associated with an asynchronous change in a state of an object associated with the VIOS cluster, wherein the alert events are associated with one or more conditions from among failures detected within the VIOS cluster, process-related statuses, resource-related statuses.

8. A data processing system comprising:
a plurality of hardware components including one or more processors, memory, and storage that are partitioned by one or more partition management firmware to provide:
a plurality of virtual input/output (I/O) servers that are communicatively coupled to each other to form a VIOS cluster, wherein the VIOS cluster includes a shared VIOs database (DB) that is accessible to the VIOSes within the VIOS cluster; and
a plurality of logical partitions (LPARs) that are provided with I/O resources via one or more VIOSes within the VIOS cluster;
a virtualization management component that facilitates one or more operations of at least one VIOS of the plurality of VIOSes and one or more operations of at least one LPAR of the plurality of LPARs; and
a first VIOS of the plurality of VIOSes, wherein the first VIOS is configured to:
receive first registration information from a first functional entity of the VIOS cluster;
register, based on the first registration information, a handler associated with a first message type;
receive second registration information from a second functional entity of the VIOS cluster;
register, based on the second registration information, a listener associated with a second message type, wherein the listener corresponds to the second functional entity of the VIOS cluster; and
in response to receiving a first message corresponding to a first alert event of the VIOS cluster, determine, based on characteristics of the first message, that the handler is associated with the first message; and calling the handler to perform a pre-established function of the handler.

9. The data processing system of claim 8, wherein the first VIOS further:
receives a second message associated with a second alert event of the VIOS cluster;
determines, based on the second message, that the listener is associated with the second message; and
notifies the listener with information corresponding to the second message.

10. The data processing system of claim 9, wherein:
the listener includes a network address of a second VIOS of the plurality of VIOSes;
a third VIOS of the plurality of VIOSes provides one or more virtual I/O services to at least one of the plurality of LPARs; and
the information corresponding to the second message indicates that the third VIOS is not functioning.

11. The data processing system of claim 10, wherein:
the second VIOS receives the information corresponding to the second message; and
the second VIOS autonomously being reconfigured to provide the one or more virtual I/O services to the plurality of LPARs in response to receiving the information indicating that the second VIOS is not functioning.

12. The data processing system of claim 8, wherein the first VIOS further records the first message within a journal that is maintained in one or more of the VIOS DB and a distributed storage repository accessible to at least the first VIOS of the VIOS cluster.

13. The data processing system of claim 8, wherein:
registering, based on the first registration information, the handler associated with the first message type includes storing a pointer to the handler in a data structure; and
registering, based on the second registration information, the listener associated with the second message type includes storing a network address associated with the listener in the data structure.

14. The data processing system of claim 8, wherein:
one or more of the first message and the second message is associated with one or more status changes of at least one VIOS of the plurality of VIOSes, wherein the one or more status changes comprise a pool up, pool down, node up, node down, and threshold exceed; and
the one or more of the first message and the second message convey alert events that are associated with an asynchronous change in a state of an object associated with the VIOS cluster, wherein the alert events are associated with one or more conditions from among failures detected within the VIOS cluster, process-related statuses, resource-related statuses.

15. A computer program product comprising:
a computer readable storage device; and
program code on the computer readable storage device that when executed by a processor within a data processing system having: one or more virtual I/O servers (VIOSes) that are communicatively interconnected within a VIOS cluster that includes a shared VIOS DB; and one or more logical partitions (LPARs) that are provided I/O functionality via the one or more VIOSes, causes at least a first VIOS of the one or more VIOSes to performs functions of:
receiving first registration information from a first functional entity of the VIOS cluster;
registering, based on the first registration information, a handler associated with a first message type;
receiving second registration information from a second functional entity of the VIOS cluster;
registering, based on the second registration information, a listener associated with a second message type, wherein the listener corresponds to the second functional entity of the VIOS cluster; and
in response to receiving a first message corresponding to a first alert event of the VIOS cluster, determining, based on characteristics of the first message, that the handler is associated with the first message; and calling the handler to perform a pre-established function of the handler.

16. The computer program product of claim 15, wherein the program code on the computer readable storage device further performs functions of:
receiving a second message associated with a second alert event of the VIOS cluster;
determining, based on the second message, that the listener is associated with the second message; and
notifying the listener with information corresponding to the second message.

17. The computer program product of claim 16, wherein:
the listener includes a network address of a second VIOS of the plurality of VIOSes;
a third VIOS of the plurality of VIOSes provides one or more virtual I/O services to at least one of the plurality of LPARs; and
the information corresponding to the second message indicates that the third VIOS is not functioning.

18. The computer program product of claim 15, wherein the program code on the computer readable storage device performs functions of:

recording the first message within a journal that is maintained in one or more of the VIOS DB and a distributed storage repository accessible to at least the first VIOS of the VIOS cluster;

the second VIOS receiving the information corresponding to the second message; and the second VIOS autonomously being reconfigured to provide the one or more virtual I/O services to the plurality of LPARs in response to receiving the information indicating that the second VIOS is not functioning.

19. The computer program product of claim 15, wherein:

registering, based on the first registration information, the handler associated with the first message type includes storing a pointer to the handler in a data structure; and registering, based on the second registration information, the listener associated with the second message type includes storing a network address associated with the listener in the data structure.

20. The computer program product of claim 15, wherein:

one or more of the first message and the second message is associated with one or more status changes of at least one VIOS of the plurality of VIOSes, wherein the one or more status changes comprise a pool up, pool down, node up, node down, and threshold exceed; and the one or more of the first message and the second message convey alert events that are associated with an asynchronous change in a state of an object associated with the VIOS cluster, wherein the alert events are associated with one or more conditions from among failures detected within the VIOS cluster, process-related statuses, resource-related statuses.

* * * * *